United States Patent

[11] 3,619,292

[72] Inventors Robert E. Brouillard;
 Charles L. Griffith, both of Cedar Rapids, Iowa
[21] Appl. No. 744,645
[22] Filed July 15, 1968
[45] Patented Nov. 9, 1971
[73] Assignee Penick & Ford, Limited
 Cedar Rapids, Iowa

[54] TABLETS AND METHOD OF FORMING
 9 Claims, No Drawings
[52] U.S. Cl................................................. 127/29,
 8/79, 99/134 R, 99/DIG. 4, 127/63, 264/122,
 424/358, 424/361, 424/362, 424/363
[51] Int. Cl................................................. C13f 3/00
[50] Field of Search.......................................... 127/29, 30,
 63; 99/DIG. 4

[56] References Cited
 OTHER REFERENCES
 A. Lachmann, Food Engineering, 38, 140, 143, 145 (May 1966).

*Primary Examiner*—Morris O. Wolk
*Assistant Examiner*—Sidney Marantz
*Attorney*—Dawson, Tilton, Fallon & Lungmus

ABSTRACT: Massecuite Aggregated Total Sugar granules are employed as a binder or binder-filler in the manufacture of compressed tablets, preferably by direct compression of a particulate tableting composition into which the Total Sugar granules have been blended. In some embodiments, the Total Sugar granules also function as an absorbent carrier, and/or as a tablet disintegrator or solubilizer. The Massecuite Aggregated Total Sugar (MATS) granules of high D.E. comprise generally spherical aggregates of cohered microcrystals of dextrose internally containing the residual oligosaccharides of the starch hydrolysis in solid solution, the granules being free-flowing, nonhygroscopic, porous and compressible.

3,619,292

TABLETS AND METHOD OF FORMING

BACKGROUND

The term "Total Sugar" is applied to starch hydrolyzate sugar mixtures of relatively high D.E. which are produced in solid form, and which are usually composed largely of crystalline or anhydrous dextrose, but which also contain residual oligosaccharides of the hydrolysis, which are essentially, noncrystallizable, and are present in the form of a solid solution. Some of the dextrose may also be present as a "glass" or solid solution. In the starch sugar industry, such Total Sugar products have been distinguished from crystalline dextrose products, which are produced from high D.E. starch hydrolyzates by crystallization of the dextrose, and separation of the crystals from the mother liquor, thereby achieving a substantial removal of the oligosaccharides, and resulting in a final crystalline product of D.E. 98 percent or higher. This crystalline product is usually obtained as dextrose hydrate, but it can be dried to produce anhydrous crystalline dextrose.

Heretofore crystalline dextrose, either as the hydrate or anhydrous, has achieved substantial use as a binder or filler in the production of tablets by wet or dry granulation processes, but not to any appreciable extent in direct compression processes. In direct compression processes, it has been found desirable to employ lactose (milk sugar) or mannitol, notwithstanding the much greater cost of lactose or mannitol than dextrose. Moreover, it appears that heretofore substantially no consideration at all has been given to the use of Total Sugar as a binder or filler in direct compression processes.

Total Sugar as it is ordinarily produced involves the formation of a crystalline massecuite, which is cast into slabs, dried, and then either crushed and ground, or shaved, followed by screening, to produce the final powdered or granular product. While this product may contain as much as 85–95 percent dextrose, the oligosaccharides in solid solution coat the dextrose crystals, and result in a hygroscopic, sticky, and nonfree-flowing product. While such material in small concentrations would have binder properties in tableting, its nonfree-flowing character is a serious limitation on use, even in wet or dry-granulation processes. Ordinary spray drying of Total Sugar solutions does not produce significantly better results, the product still being hygroscopic and sticky, and also tending to be in an unstable crystalline form.

Although substantial progress has been made in overcoming the problems associated with direct compression processes, granulation methods are still most widely used in tablet preparation, particularly the wet-granulation method. Wet or dry-granulation improves compressibility, but an excessive number of preparatory steps are required, as well as the undesirable time and labor necessary to carry out the procedure, especially on a large scale. The steps in the wet method are (1) weighing, (2) mixing, (3) granulation, (4) screening the damp mass, (5) drying, (6) dry screening, (7) lubrication, and (8) compression.

When tablet ingredients are sensitive to moisture or are unable to withstand elevated temperatures during drying, and when the tablet ingredients have sufficient inherent binding or cohesive properties, slugging may be used to form granules. This method is referred to as dry granulation, precompression, or the double-compression method. While it eliminates some of the steps of the wet-granulation method, it still includes (1) weighing, (2) mixing, (3) slugging, (4) dry screening, (5) lubrication, and (6) compression. Where the active ingredient does not have sufficient binding or cohesive properties, a binder, or binder-filler is added prior to slugging. Initially, large tablets are made as slugs, and then the compressed slugs are ground or otherwise reduced to the desired particle size and sieved.

There is a need for improved binders, such as binder-fillers, in the dry-granulation or slugging process, especially binders having improved binding and compressibility properties, while being readily handled and less expensive than many binders presently used. However, an even greater need has been recognized for improved binders or binder-fillers in direct compression processes. While most of the mechanical problems of direct compression tableting have now been solved, as indicated above, the use of this process is still limited by the need for relatively expensive binders and fillers, such as spray-dried lactose or spray-dried mannitol.

SUMMARY

This invention is based in part on the discovery that a new physical form of Total Sugar, which is referred to herein as "Massecuite Aggregated Total Sugar" granules (or as "MATS" granules) has remarkable tableting properties, which make it highly advantageous as a binder or binder-filler in the formation of compression tablets, especially by the method of direct compression. MATS granules can also be used as a binder in known granulation processes, and it provides a considerable advantage in the precompression or dry-granulation method of tableting, but its advantages are maximized in the direct compression process. In the formation of tablets by direct compression from a particulate mixture, the MATS granules can be blended into the mixture as a partial or complete substitute for spray-dried lactose or spray-dried mannitol, resulting in a tableting composition which is free-flowing, compressible, and which produces tablets having excellent cohesive properties. The resulting tablets can therefore provide other advantages of dextrose as a binder or filler, such as taste or organoleptic properties. For example, dextrose hydrate produces a cooling effect when dissolved in the mouth, which can be highly desirable for tableted food or pharmaceutical products, which are to be chewed or sucked. The dextrose hydrate can also enhance other flavors in the tablets, which may be particularly desirable for tableted food or candy products, such as candy drops or lozenges containing fruit or spice flavoring agents.

Another advantage of compressed tablets produced with MATS granules is that while they are highly cohesive and resistant to breakage or crumbling, they dissolve or disintegrate rapidly in contact with aqueous fluids. This is apparently due not only to the high rate of solubility of dextrose in microcrystalline form, but also to some extent to the preservation of the capillary or absorptive capacity of the Total Sugar in the completed tablets. Because of this action, the amount of disintegrator additives can be reduced or entirely eliminated.

Still another important advantage of the use of MATS granules in forming compressed tablets, particularly by direct compression, is that other additives can be incorporated in the sugar granules before compression of the tablets. For example, the Total Sugar granules can be impregnated with coloring or flavoring agents, which will effectively color or flavor the completed tablets, and this impregnation will not interfere with the free-flowing character of the granules, and can save time and labor in preparing the tableting composition. Tableting lubricants, including waxy or oily lubricants, can also be combined with the Total Sugar granules by impregnation. This is particularly desirable where the Total Sugar granules are used as a filler, that is, in a relatively high concentration, since in this way sufficient lubrication can be provided, so that it will not be necessary to otherwise add lubricant to the tableting composition. Here again considerable time and labor can be saved. Furthermore, where the tableting composition provides a particular problem with respect to cohesiveness, auxiliary tableting binders can be impregnated into the Total Sugar granules, thereby enhancing the cohesiveness of the total formulation.

It can therefore be seen that for the first time this invention provides a means for utilizing Total Sugar as an effective binder or binder-filler in compressed tablet formulation. Not only are the MATS granules superior to ordinary crystalline dextrose in conventional processes, such as dry-granulation processes, but it is adaptable for use in direct compression processes. This provides a great process improvement, and the substitution of MATS granules for lactose or mannitol in the formation of tablets by direct compression results in a very large economic saving.

DETAILED DISCUSSION

This invention is concerned with the manufacture of tablets by compression as distinguished from molding processes. The term "tablets" is used generically and is not intended to be limited to the form of the tablets. While compressed tablets are frequently is discoid form, they may also be round, oval, oblong, cylindrical, triangular, ring-shaped, etc. Compressed tablets are formed from particulate tableting compositions where the ingredients may be in the form of powders or granular materials. For introduction into the tableting machines, the particulate compositions must be free-flowing. The tableting composition must also be compressible to a compactive or cohesive state. Still another requirement is that the tableting composition should provide a degree of lubrication.

The basic mechanical unit in all tablet-compression equipment includes a lower punch which fits into a die from the bottom and an upper punch, having a head of the same shape and dimensions, which enters the die cavity from the top after the tableting material fills the die cavity. The tablet is formed by pressure applied on the punches and is subsequently ejected from the die. The weight of the tablet is determined by the density and the volume of the material which fills the die cavity. Therefore, the ability of the powder or granulation to flow freely into the die is important in insuring a uniform fill, as well as in facilitating the continuous movement of the particulate material from the source of supply or feed hopper. If the tablet granulation does not possess cohesive properties, the tablet after compression will crumble and fall apart on handling. As the punches must move freely within the die and the tablet must be readily ejected from the punch faces, the material must have a degree of lubrication to minimize friction and to allow for the removal of the compressed tablets.

In general, therefore, this invention is concerned with the manufacture of compressed tablets and the like wherein increments of a particulate tableting composition are compressed to compacted cohesive tablets. In a preferred embodiment, the tablets are manufactured by direct compression from a free-flowing particulate tableting composition wherein the tableting composition is pressure punched in dies to compacted cohesive tablets without preparatory granulation thereof. Where necessary, the tableting composition can be subjected to precompaction, including slugging procedures, or precompaction by forced-flow die feeders, such as are employed in high speed rotary tableting machines. In such machines, compression takes place as the upper and lower punches pass between a pair of rollers, which produce a slow squeezing effect on the material in the die cavity from the top and the bottom, giving a chance for the entrapped air to escape. The lower punch then lifts up and ejects the tablet.

The granular binder or binder-filler for use in the method of this invention can be produced by the process described in copending application Ser. No. 674,168, filed Oct. 10, 1971, entitled "Novel Granular Sugar Products and Process for Producing" now U.S. Pat. No. 3,540,927. For the purpose of the present invention, we are concerned with granular dextrose products produced from starch hydrolyzates of high D.E., which are referred to as "Total Sugar" products. Such Total Sugar products are composed of dextrose in admixture with residual oligosaccharides of the saccharification. The process of the cited application has sometimes been referred to as "Spray Crystallization." However, the product produced by the process can perhaps more accurately be described as "Spray-Drier Aggregated," as crystallization takes place primarily before and after the spray drying step. In addition to the removal of water, a principal function of the spray drying is to form the basic aggregate structure with the granular aggregates thus obtained being subsequently aged and dried to complete the process.

More specifically, in the process of the cited application, a water solution of a crystallizable sugar is subjected to partial crystallization to form a pumpable massecuite composed essentially of microcrystals of sugar dispersed in a water solution of sugar. This massecuite, which may contain from 40 to 60 percent of the sugar in crystalline form, is sprayed into a drying air stream to form atomized droplets and to remove part of the water from the droplets in the air stream to form granular aggregates of the microcrystals containing residual crystallizable sugar solution. Essentially each droplet forms a single aggregate of generally spherical shape. This step is preferably carried out in a spray dried tower where the massecuite droplets are formed at the top and fall downwardly through the tower with the evaporation of water therefrom. Where the hydrate crystal form is desired, the spray dried is operated at a sufficiently low temperature to avoid formation of anhydrous dextrose or other unstable crystal forms. For example, the massecuite droplets during spray drying of a starch hydrolyzate can be kept below 50° C. With sucrose and other sugars, the spray drying temperature can be varied over a wider range, especially where the sugar has only one crystalline form, such as with sucrose which only forms anhydrous crystals.

The granular crystalline material produced by the spray aggregation process just described, will contain additional crystallizable sugar in the form of a supersaturated solution that will rapidly crystallize. However, the granules obtained from the spray dried have sufficient structural integrity to permit them to be transferred to other processing apparatus for completion of the crystallization. This further processing can include an aging procedure in which crystallization is continued without removal of much additional water. As a final step, however, it is desirable to subject the granular aggregates to drying to force completion of the crystallization, and at the same time to reduce the free water content to a very low level. Where part of the water combines with the sugar as water of crystallization, free water is eliminated in this way as well as by evaporation. The free water content of the final granular products will usually be below 1 percent by weight, and may be as low as 0.5 percent or lower. Where the granular product is formed principally of dextrose monohydrate the total water content will be about 9 percent by weight even though there is little or no free water. Overdrying can therefore convert some of the monohydrate crystals to anhydrous crystals. A range of granular products can therefore be obtained which are useful in the tableting method of this invention. For example, the crystalline material of the granules may consist substantially entirely of dextrose hydrate, or substantially entirely of anhydrous dextrose, or a mixture of the hydrate and anhydrous forms in any desired proportion.

Where the granular tableting material has been prepared by the process of the cited copending application Ser. No. 674,168 from a Total Sugar massecuite, the material will comprise generally spherical granules of crystalline dextrose and the granules will be formed essentially of aggregates of dextrose microcrystals. The granular size can range from about 100 to 400 microns, typically averaging 200–300 microns. The size distribution can be modified by screening of the granular product to remove oversize and undersize material. The terms "Spray-Drier Aggregated" or "SDA" refer to Total Sugar granules originating from individual spray-dried droplets of a Total Sugar massecuite comprising microcrystals of dextrose dispersed in a water solution thereof, additional microcrystals of the dextrose having been deposited internally after the spraying of the droplets. The SDA Total Sugar granules comprise cohered dextrose microcrystals with internal capillary networks. Total Sugar granules of the same basic structure (herein generically referred to as MATS granules), which are usable for the purpose of the present invention can also be produced by the process of copending application Ser. No. 744,958, filed on even date herewith, and entitled "Sugar Granulation Process and Products Produced Thereby." In that process a pumpable massecuite consisting of dextrose microcrystals suspended in a saturated solution of dextrose is intermixed with a bed of previously processed recirculated dextrose which is in the form of aggregated microcrystals. The mixture is then dried under conditions which contribute to the further crystallization of the dextrose in solution as well as to water removal. The final product has the form of aggregates of cohered dextrose microcrystals and if desired the particle size can be varied by crushing or grinding and sieving. The fractured granules may not be spherical and will have a somewhat more irregular shape than SDA granules, but they are still free-flowing granules and can be used in the process of the present invention. Consequently, the terms "Microcrystalline Aggregated Total Sugar" and "MATS" granules as used herein are intended to encompass such materials, which are equivalent in properties to the SDA granules obtained by the process of the cited application Ser. No. 674,168.

The D.E. (dextrose equivalent) of the Total Sugar forming the granules should be at least 88 percent. MATS granules having a D.E. ranging from 92 to 98 percent are particularly desirable for compression tableting. Total Sugar granules can be produced having a D.E. higher than 98 percent by a more complete conversion of the starch hydrolyzate to dextrose. Therefore, if it is desired to employ a filler or binder which is substantially pure dextrose, Total Sugar granules having a D.E. of from 98 to 100 percent can be utilized. In most applications, however, the residual oligosaccharides in solid solution improve tableting properties. The oligosaccharides can function as an auxiliary binder to the microcrystalline dextrose without interfering with the free-flowing character of the granules, since the oligosaccharide material is within the interior of the granules as produced, while becoming available to act as a binder when the granules are crushed during compression tableting.

In many applications, the MATS granules can advantageously have a total moisture content ranging from 8-10 percent, substantially all of the dextrose being in the form of dextrose monohydrate with the free water less than 1 percent, or preferably less than 0.5 percent. The content of anhydrous dextrose can be kept below 10 percent. In certain special applications, the granules can contain a mixture of anhydrous crystalline dextrose with crystalline dextrose hydrate, such as from 20-80 percent by weight anhydrous dextrose in admixture with from 80-20 percent by weight dextrose hydrate. For example, anhydrous dextrose has the ability to absorb free water, which is converted to water of crystallization. Thus, anhydrous crystalline dextrose can function as a desiccant for a tableting composition. In such applications, the MATS granules can contain 90 percent or more of the crystalline dextrose in the anhydrous form.

While the method of this invention is not limited to any particular end use of the tablets, the use of MATS granules as a binder or filler will be most advantageous it is believed in the preparation of tablets for pharmaceutical or food purposes. In pharmaceutical applications, the dextrose can also perform the functions of a sweetening agent, improving palatability for chewable drug tablets, or tablets that are designed as mouth or throat lozenges, and masking the taste of otherwise unpalatable active ingredients. In food tablet applications, the Total Sugar will itself provide a food component, and in such applications the Total Sugar may be the major ingredient of the tablets, such as with candy lozenges, or where the lozenge is partly candy and partly medicinal, as with cough drops. In general, the tableting process of this invention can be used to produce bodies shaped by compression for a wide variety of articles of commerce, such as candy pieces, lozenges, antiacid medicaments, drug-containing tablets, convenience foods, color-containing compositions, etc. As previously explained, such bodies can be shaped by compression on standard tableting machines without prior granulation. The tablets will show excellent conformity to mold characteristics, and will be cohesive while having easily controllable disintegration properties. The quantity of MATS granules used in the compression formulation should at least be sufficient to provide an effective binder action, and in most applications will be sufficient to serve both as a binder and a filler. Beyond this, such as in the case of candy pieces or lozenges, the principal constituent can be the MATS granules with relatively small amounts of flavorants, colorants, or drugs. On the other hand, in the case of tablets where Microcrystalline Aggregated Total Sugar is used strictly as a binder, such as with salt tablets, as little as 5 percent by weight of the Total Sugar can be used while obtaining excellent processing and tablet characteristics. Speaking broadly, the tablets can contain from 2-98 percent by weight of the MATS granules. Effective binding action can frequently be obtained with as little as 2-3 percent of the sugar granules, but in most applications from 5-10 percent by weight or more is desirable to achieve adequate cohesiveness in the final tablets. Where the sugar granules are also used as a filler, the amount employed will typically range from at least 10 percent up to 30 percent by weight or higher. A typical range for combined binder and filler properties will be from 5-25 percent by weight.

As previously indicated, additives desired in the completed tablets can in many cases be incorporated in the MATS granules prior to the blending of the sugar granules with the rest of the tableting formulation. Such additives include auxiliary binders, tableting lubricants, flavoring agents, coloring agents, tablet disintegrating agents, etc.

In tableting, the term "binders" is applied to agents used to impart cohesive qualities to powdered or granular materials. They impart a cohesiveness to the tablet formulation which insures the tablet remaining intact after compression.

According to the present invention, the MATS granules are employed as a principal binder component of the tablets. However, other tableting binders can be used in conjunction with the MATS granules. Binders which are normally tacky or sticky, and therefore present formulation problems in maintaining the free-flowing character of the tableting composition, can advantageously be impregnated into and/or coated onto the MATS granules. For example, water soluble, tacky binders, such as molasses or malt syrup, gelatin, or natural or synthetic gums, such as acacia, sodium alginate, extract of Irish moss, carboxymethyl cellulose, methyl cellulose, polyvinyl-pyrrolidone, etc., can be impregnated into the SDA granules by the method described in copending application Ser. No. 744,642, filed on even date herewith, and entitled "Method of Combining Crystalline Sugar with Modifying Agents and Products Produced Thereby." The binder is dissolved or dispersed in water, and the water dispersion is sprayed on a bed of the MATS granules, while agitating and intermixing the bed. The spray application is at a rate facilitating rapid coating and absorption of the dispersion from the outer surface of the granules into the interiors thereof, and the agitation and intermixing prevents agglomeration of the granules during spraying. Thereafter, the granules can be subjected to drying to remove water therefrom while leaving the partially or completely dehydrated binder on and within the granules. The percent of binder with which the granules are impregnated can be increased by the use of a plurality of spraying and drying cycles. Where the auxiliary binder is organic-solvent soluble, but not water soluble, the granules can be impregnated and/or coated as also described in the above copending application, filed on even day herewith.

The methods of the cited copending applications can also be employed for impregnating the granules with other additives, such as lubricants, flavoring agents, coloring agents, etc. However, the impregnation of the granules with a lubricant will usually not be a complete substitute for the incorporation of lubricants in the tableting composition, since the lubricants are designed to provide a number of functions. For example, so-called glidants, which act as flow regulators by improving the flow properties of the tableting mixture from the feed hopper to the dies, can be directly mixed and blended into the composition rather than being impregnated into the granules. Most such glidants are fine powders such as talc, starch, lycopodium, magnesium stearate, calcium stearate, etc.

Lubricants which perform the function of antiadhesives or antisticking agents are most adaptable to incorporation in the granules, since the granules will be deformed and ruptured during the compressing of the tablets, thereby releasing the lubricant to perform its function. The purpose of antisticking agents is to prevent adhesion of the tablet surface to the dies and punches during compression. Examples of antisticking agents are paraffin, stearic acid, cocoa butter, and soaps. Liquid oils, including animal, vegetable, mineral or synthetic oils, can also be used. Most of these antisticking lubricants are normally liquid or can be liquefied by heating. They can thereby be applied to the granules as liquids or melts, which are sufficiently liquid to achieve penetration and impregnation of the granules, as well as partial or complete surface coating of the granules. In these instances, the MATS granules function as carriers for the antisticking agent. Where required, the antisticking agent can be thinned with an organic solvent, the solvent mixture impregnated into the granules, and the granules dried to remove the solvent while leaving the antisticking agent, as described in the cited copending application entitled "Method of Combining Crystalline Sugar with Modifying Agents and Products Produced Thereby."

Colors in compressed tablets may make the tablets more aesthetic in appearance, but they also help the manufacturer control the product during its preparation, as well as serving as a means of identification to the user. Any of the approved water-soluble dyes or mixtures of the same, may be used to color the tablets by impregnating the MATS granules with the color. This can be conveniently done by dissolving the dye in water, impregnating the granules, and then drying the granules to remove the water. The impregnation process can be carried out as described in the cited copending application entitled "Method of Combining Crystalline Sugar with Modifying Agents and Products Produced Thereby." This procedure is particularly desirable where the granules also function as a filler, such as where the tablets contain from 10–30 percent by weight, or higher percentages.

Where the tablets are designed as lozenges or chewable tablets, such as where the tablets are cough drops or candy, flavoring agents can be incorporated in the MATS granules. Flavoring oils in the form of alcohol tinctures can be used to impregnate the granules, by the procedure described in the cited copending application entitled "Method of Combining Crystalline Sugar with Modifying Agents and Products Produced Thereby." Where the flavoring agent is water soluble, as with many synthetic fruit flavors, a water solution of the flavor can be employed to impregnate the granules, as described in the other above-cited copending application.

This invention is further illustrated by the following examples in which the tablets were all made by direct compression without slugging or regranulation.

EXAMPLE 1

Spray-Dried Aggregated, microcrystalline Total Corn Sugar (92–93 percent dextrose) prepared by the process of U.S. Pat. application No. 674,168, was blended with 0.1 percent by weight of magnesium stearate powder. The latter was added as a lubricant to prevent adhering to the die wall or sticking to punch face. The mixture was placed in a Colton Type Tablet Press and tablets were formed. The tablets were smooth, uniform, sharp-edged and there was no evidence of sticking, splitting or capping.

EXAMPLE 2

Spray-Drier Aggregated, microcrystalline Total Corn Sugar (92–93 percent dextrose) prepared by the process of U.S. Pat. application No. 674,168 was dry blended with an antiacid (tetrahydroxy dialuminum magnesium carbonate), coloring material, and flavor additives. The mixture was run in a Colton Tablet Press. The tablets which were formed were compact, sharp-edged, and there was no cracking, splitting or capping. The Total Sugar granules gave very good binding and good strength characteristics. When an attempt was made to run regular commercial crystal dextrose in the same formulation a substantial percentage of the tablets cracked and all had poor strength characteristics.

EXAMPLE 3

Sodium chloride was blended with 10 percent by weight of SDA Total Corn Sugar (prepared by the process of U.S. Pat. application No. 674,168). When pressed in a Colton Tableting Machine the tablets which were formed with this mixture were hard, smooth, sharp-edged, and had excellent strength characteristics. Very precise and uniform tablets were obtained and they had a pleasing surface gloss. The sugar effectively masked the unpleasant saline taste associated with most salt tablets.

EXAMPLE 4

Two parts of citric acid were dissolved in 30 parts of a 70° Brix concentrated grape juice and the mixture was blended into 100 parts of SDA corn sugar (prepared by the process of U.S. Pat. application No. 674,168). After air drying the free-flowing granular product, it was blended with 0.5 parts of powdered magnesium stearate and tableted in a four pocket Colton tablet press. No sticking to the dies was observed and the tablets showed no splitting or capping. They were smooth, sharp-edged and had excellent strength characteristics. When added to cold water, they dissolved readily to form a clear solution suitable as a fruit drink.

EXAMPLE 5

A water solution of caramel coloring was blended into a bed of SDA Total Sugar granules and the impregnated granules were dried by heating in a circulating air stream. The resulting free-flowing product was then readily tableted to give readily soluble, premeasured quantities of coloring suitable for use in the preparation of foods or beverages.

EXAMPLE 6

A mixture of vanillin and pure vanilla extract in an alcohol solution was thoroughly mixed into a bed of SDA Total Sugar granules so that the resulting impregnated granules consisted of 10 percent by weight of the added solution. Following evaporation of the alcohol, the resulting free-flowing granules were readily tableted to produce smooth, strong, sharp-edged tablets each having the flavoring value of one-teaspoonful of standard-strength vanilla extract. They were readily soluble and suitable for use in food preparation.

EXAMPLE 7

A uniform dry blend of the following was prepared: 0.5 percent Prednisone, 0.5 percent powdered magnesium stearate, and 99.0 percent SDA Total Sugar granules (which contained about 0.5 percent free moisture). The free-flowing mixture was then readily made into 5 grain (total weight) tablets which were hard, smooth, and sharp-edged. They had the desirable feature of dissolving completely in cold water in less than four minutes, whereas, tablets using conventional formulations frequently take several times that long to dissolve.

EXAMPLE 8

Twenty-seven parts of as-is molasses (containing about 75 percent solids) was diluted with 13 parts of water to give a solution containing about 20 parts molasses solids. This was then intimately mixed into 400 parts of SDA Total Sugar granules and air dried to give a free-flowing product. The product contained approximately 5 percent (on the original sugar) of the added molasses solids (which is about the same as the nondextrose solids present in the original sugar) and suits it to those tableting operations where increased binder strength is desired.

EXAMPLE 9

An emulsion was prepared of 10 parts 2-fold orange oil (containing 0.1 percent BHT stabilizer) and 0.1 part emulsifier (Tween-20) in 20 parts of water in which had been dissolved 4 parts citric acid. The emulsion was then used to impregnate 400 parts of SDA Total Sugar granules which had been vacuum dried down to a total moisture content of 1.5 percent. The water in the added emulsion was almost immediately absorbed in converting the anhydrous dextrose to the hydrated form so that the mixed product was free-flowing without any further drying. The oil present acted as a die lubricant so that the material was readily tableted without difficulty. The tablets formed dissolved readily to give a pleasant orange flavored beverage.

When in tablet form the additives which can be impregnated into or admixed with the MATS granules have a reduced exposure to the air so that their tendency to volatilize or to be oxidized is minimized. This can, in turn, be lessened still further by a coating or encapsulating operation performed on the tablets. Furthermore, the density, hardness and rate of solution or disintegration can be modified by the selection of the tableting pressure. Also, where it is desired to control particle size, and/or the volume of air entrapped in forming the tablets, the MATS granules can be crushed or milled and used in the method of this application. Other advantages have been indicated in the foregoing or will readily occur to those skilled in the tableting art.

We claim:

1. The method of manufacturing compressed tablets wherein increments of a tableting composition are compressed to compacted cohesive tablets, characterized by the step of blending into said particulate tableting composition before compression thereof a binder-effective concentration of starch hydrolyzate sugar in the form of granular aggregates of dextrose microcrystals, said granular aggregates being generally spherical and having been aggregated from a microcrystalline massecuite of a starch hydrolyzate Total Sugar having a D.E. of at least 92 percent, said granular aggregates consisting essentially of cohered dextrose microcrystals and oligosaccharides in solid solution, said dextrose crystals being selected from the group consisting of crystalline dextrose hydrate, crystalline anhydrous dextrose, and mixtures thereof.

2. The method of claim 1 in which the major portion of the dextrose of said granular aggregates is in the form of crystalline dextrose hydrate.

3. The method of claim 1 in which the major portion of the dextrose of said granular aggregates is in the form of anhydrous crystalline dextrose.

4. The method of claim 1 wherein said granular aggregates have a D.E. in the range of 92 to 98 percent and comprise at least 5 percent by weight of said tableting composition.

5. In the method of manufacturing tablets by direct compression from a free-flowing particulate tableting composition wherein the tableting composition is pressure punched in dies to compacted cohesive tablets without preparatory granulation thereof, the method characterized by the steps of blending into said particulate tableting composition without essentially changing the free-flowing character thereof, a binder-effective concentration of starch hydrolyzate Total Sugar in the form of free-flowing granular aggregates of dextrose microcrystals, said granular aggregates being generally spherical and having been Spray-Drier Aggregated from a microcrystalline massecuite of a starch hydrolyzate composed of Dextrose and oligosaccharides and having a D.E. of at least 92 percent; and thereafter, while said blend remains in said free-flowing particulate condition, subjecting increments of said blend to said pressure punching to form said tablets.

6. Compressed tablets produced by the method of claim 5.

7. The method of claim 5 in which said granular aggregates have a D.E. within the range from 92 to 98 percent, and comprise at least 5 percent by weight of said blend.

8. The method improvement of claim 5 in which said granular aggregates comprise from 10 to 30 percent by weight of said tableting composition, thereby serving as both a filler and binder.

9. The method improvement of claim 5 in which said granular aggregates prior to blending with said tableting composition are impregnated with a tablet additive carried in a water base impregnating vehicle.

* * * * *